UNITED STATES PATENT OFFICE.

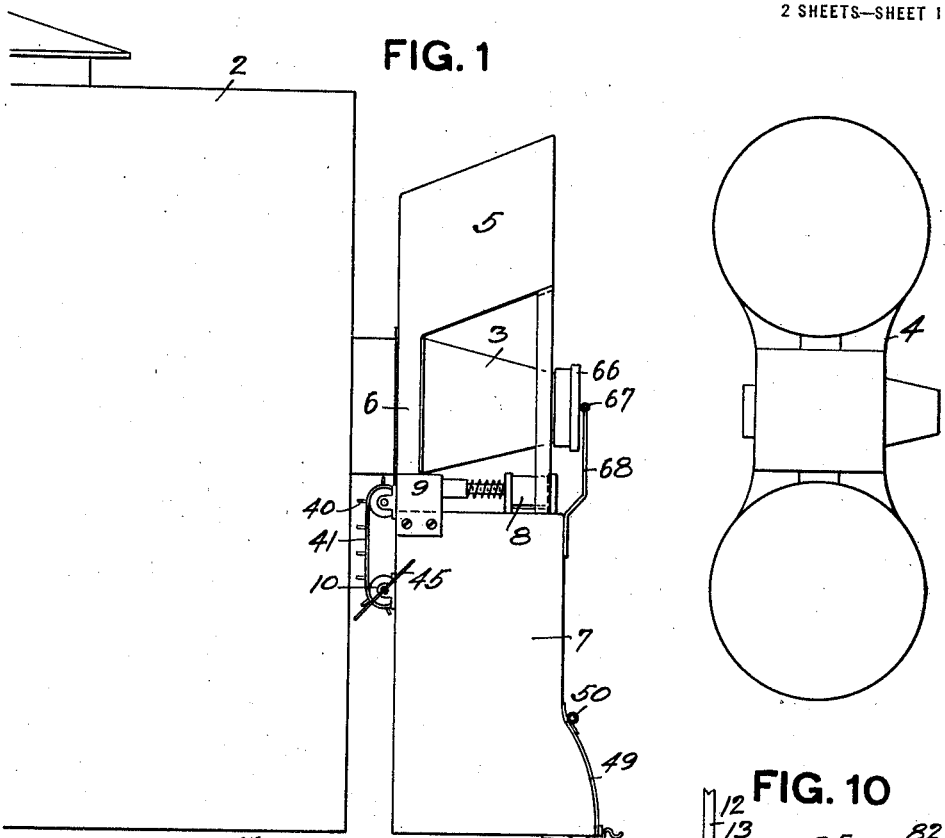
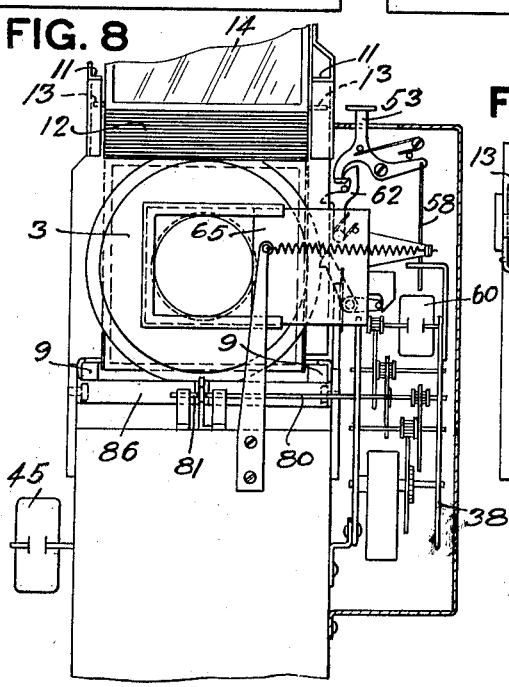
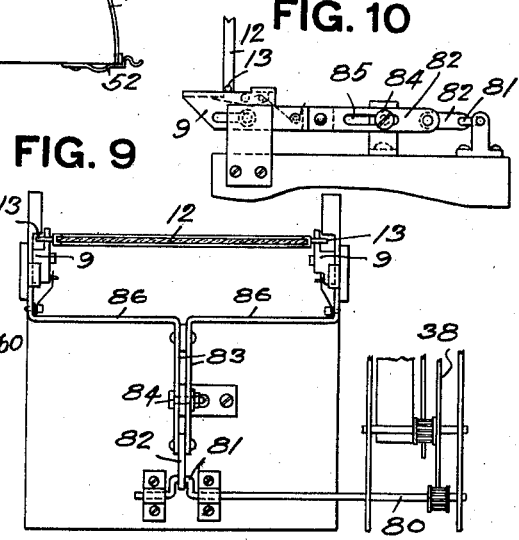

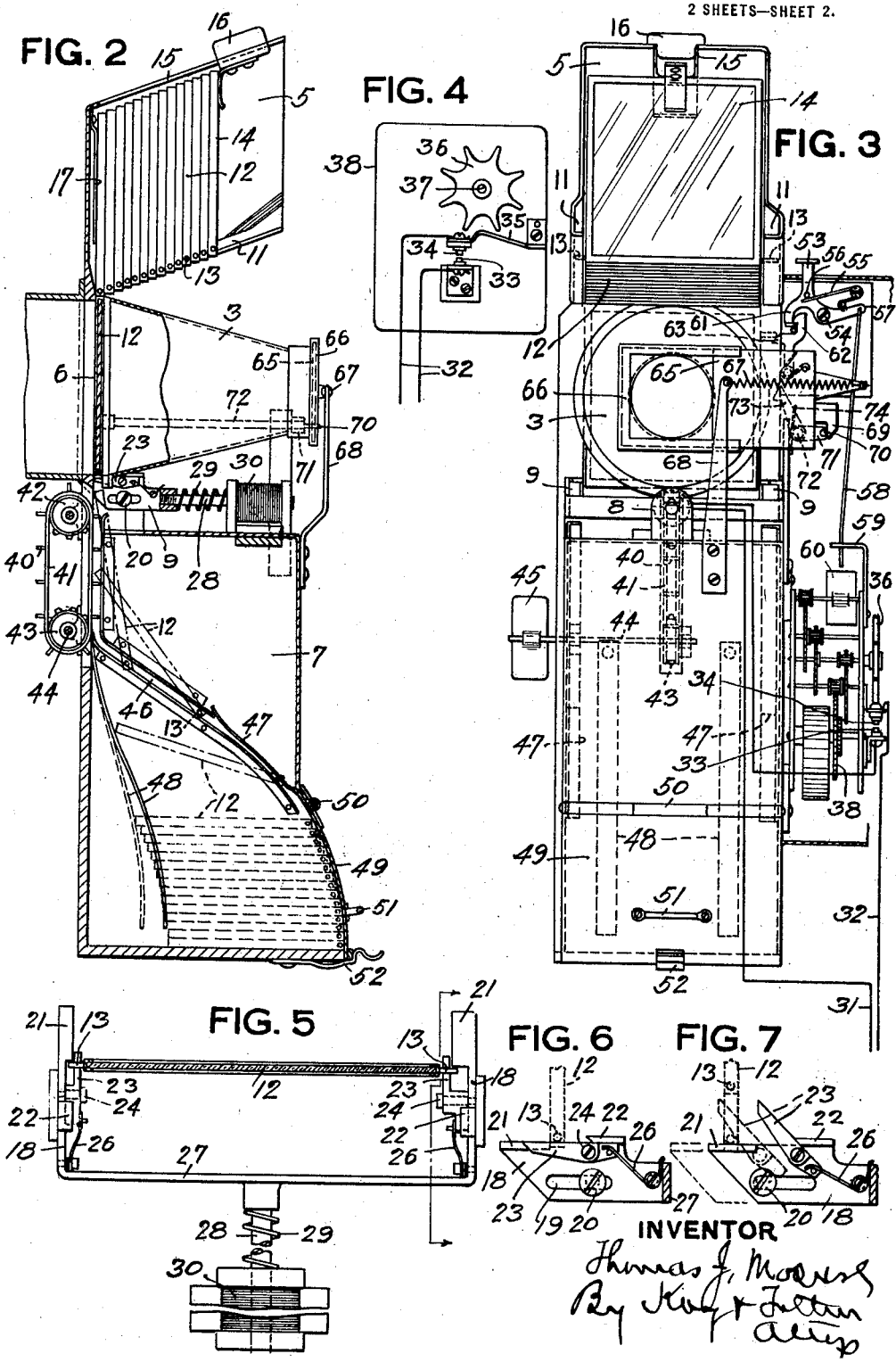

THOMAS J. MOSURE, OF NILES, OHIO.

EXHIBITING APPARATUS.

1,387,294. Specification of Letters Patent. Patented Aug. 9, 1921.

Application filed March 19, 1920. Serial No. 367,145.

*To all whom it may concern:*

Be it known that I, THOMAS J. MOSURE, a citizen of the United States, and resident of Niles, in the county of Trumbull and State of Ohio, have invented a new and useful Improvement in Exhibiting Apparatus; and I do hereby declare the following to be a full, clear, and exact description thereof.

My invention relates to apparatus for exhibiting pictures, advertisements and the like by projection upon a screen, and it has for its object to provide a machine by which a series of transparent slides may be automatically brought in succession into the proper position with respect to a source of light.

My invention is particularly, though not exclusively, intended for use in connection with moving picture projecting machines. In the ordinary operation of moving picture machines, an interval occurs between the successive pictures which are shown at each performance, or between the performances. It is customary to make use of this interval for throwing upon the screen a series of announcements, advertisements or the like, and for this purpose the announcements or advertisements are placed upon glass slides and a frame is provided which is moved back and forth in front of the light projector, as in ordinary stereopticon machines, the slides being inserted in the frame and removed therefrom by hand. This, of course, requires the attention of one of the operators, and it frequently happens that the operator breaks some of the slides by handling them carelessly or neglects to exhibit all of the slides which have been provided.

According to my present invention, I provide a machine of compact and readily portable construction by means of which a series of slides bearing announcements, advertisements or pictures are automatically moved into proper exhibiting position without attention from the operator after the machine is once started. My invention consists, in general, of a frame adapted to be attached to an ordinary moving picture or stereopticon lantern and provided with a magazine for holding a series of slides, a display space into which the slides successively fall by gravity, an escapement mechanism for holding each slide in position the required length of time and for then releasing the slide, and a receptacle disposed below the display position for receiving the slides after they have been exhibited. The escapement is actuated by clockwork, which operates to move the escapement either directly or through an electromagnet.

In the accompanying drawing, Figure 1 is a side elevational view showing somewhat diagrammatically a moving picture machine equipped with an exhibiting apparatus constructed in accordance with my invention. Fig. 2 is a central vertical sectional view through the exhibiting apparatus shown in Fig. 1. Fig. 3 is a front elevational view of the same apparatus; Fig. 4 is a side elevational view showing means for operating the electric contact members; Fig. 5 is a fragmentary plan view showing the escapement, together with one form of operating mechanism; Fig. 6 is an enlarged side elevational view of one of the escapement members. Fig. 7 is a view similar to Fig. 6 showing the escapement member in another position; Fig. 8 is a front elevational view similar to the central portion of Fig. 3, but showing the clockwork mechanism connected directly to the escapement mechanism; Fig. 9 is a plan view showing the connection between the clockwork and the escapement in the construction of Fig. 8; and Fig. 10 is a side elevational view of the mechanism shown in Fig. 9.

Fig. 1 shows a moving picture machine of a well-known construction consisting of a lantern 2, a condenser tube 3 and a reel mechanism 4. A slide exhibiting device constructed in accordance with my device is shown attached to the condenser tube 3 and consists of an upper magazine 5, a display space 6, a lower receptacle 7 for receiving the slides after they are exhibited, a solenoid mechanism 8 for operating an escapement mechanism 9 and a brake mechanism 10 for retarding the downward movement of the slides as they pass from the display space 6 into the receptacle 7.

The upper magazine 5 consists, as best shown in Figs. 2 and 3, of a rectangular box or frame having downwardly inclined guides 11 in which are received a number of slides 12. Each of the slides carries near its lower corners a pair of pins 13, the pins on the uppermost slide 14, which may be a "dummy" slide being longer than the pins on the remaining slides, for a purpose to be described below. The top of the receptacle 5 is provided with a slot 15 in which travels a weighted follower 16 that presses upon the slides 12 and tends to move them toward the lower part of the magazine against a cushioning spring 17.

The slide in the lower part of the magazine 5 rests directly upon the preceding slide which occupies vertical guides at the display position 6 and the pins 13 of the slide in the display position rest upon the escapement devices 9, one of which is disposed at each side of the machine, as shown in Fig. 5, and is constructed in the manner shown in Figs. 5, 6 and 7. As shown, each of the escapement members comprises a vertical plate 18 having a slot 19 by means of which the plate 18 is slidably supported on a fixed screw or pin 20. The plate 18 has two lateral projections 21 and 22 at its top edge and carries an arm 23 pivoted to the plate at 24. A pin 25, engaged by a spring 26, tends to move the arm 23 into the upwardly inclined position shown in Fig. 7. The two escapement devices are connected to move together, as shown in Fig. 5, by a bar 27 to which is secured a rod 28 surrounded by a spring 29 and secured to the core member of a solenoid 30.

It will be observed that when the solenoid is energized, and its core thereby drawn into the coil, the escapement devices will be simultaneously moved from left to right as seen in Figs. 6 and 7, and that when the current through the solenoid is interrupted the spring 29 will force the escapement members in the opposite direction. This reciprocating movement results in releasing the plate 12 which, in the position shown in Fig. 6 is supported by the pins 13 upon the arms 23 of the escapement devices. As the escapement devices are moved from the position shown in Fig. 6 into the position shown in Fig. 7, the arm 23 is released and moved into its inclined position by the spring 26. The slide 12 does not descend, however, because the pins 13 still rest upon the projections or ledges 21. When the escapement devices move in the opposite direction far enough to remove the ledges 21 from beneath the pins 13, the slide 12 will fall by gravity and the next slide from the magazine will also descend. When it reaches the display space, this second slide will be stopped by the escapement devices, since its pins 13 engage the arms 23 and force them down into the position shown in Fig. 6. This operation is repeated during each reciprocation of the escapement mechanism.

The lead-wires 31 and 32 of the solenoid 30 are connected to a suitable source of electric current, not shown, and for the purpose of operating the escapement mechanism at predetermined intervals, the lead-wire 32 is connected across a time-controlled circuit closer, which as best shown in Fig. 4, consists of a stationary contact member 33 and a movable contact member 34 that is carried by a spring member 35. A star-wheel 36 is mounted adjacent to the spring member 35 and is carried upon the end of a shaft 37 which forms a part of a clockwork mechanism 38 which may be of any usual or desired construction. As the shaft 37 rotates, the points of the star-wheel 36 will successively engage the spring member 35 and will thereby move the contact member 34 into engagement with the contact member 33, thus closing the circuit through the solenoid 30 and moving the escapement members from left to right as seen in Figs. 2 and 6. Almost immediately, the contact members 33 and 34 will again separate, thus interrupting the circuit through the solenoid and permitting the escapement members to return to their normal position under the influence of the spring 29. These repeated movements operate to successively release the slides in the manner described above.

When each slide is released by the escapement mechanism it falls until it engages one of a series of pins or hooks 40 which form part of the brake mechanism 10 and are carried by an endless chain 41 that passes around upper and lower sprocket wheels 42 and 43. The sprocket wheel 43 is mounted upon a horizontal shaft 44 to which is connected a retarding mechanism of any desired construction. As shown, this retarding mechanism consists simply of a fan 45, but this fan may be replaced by a train of gear wheels, such as is found in an ordinary clock escapement, or by any other equivalent means, the only requirement being that the movement of the chain 41 shall be retarded sufficiently to cushion the fall of the slides descending from the display space.

While descending upon the pins or hooks 40, the pins 13 formed on the slides engage guide-ways 46 secured to the sides of the lower receptacle 7. These guides serve to carry the lower edge of each slide downwardly and forwardly as shown in Fig. 2 and upon reaching the lower ends of the guide-ways 46, the lower end of the slide encounters a pair of springs 47, while the upper end of the slide falls upon a pair of springs 48, these springs being supported at their lower and upper ends respectively, and serving to effectively cushion the fall of the slides, which finally are deposited in a pile at the bottom of the receptacle 7, as shown in Fig. 2. The front of the lower part of the receptacle 7 is closed by a door 49 pivoted at 50 and provided with a handle 51 and a spring fastener 52.

The operation of the machine is controlled by starting and stopping the clockwork mechanism 38. For this purpose I provide a push button 53 shown in Fig. 3, which is pivoted at 54 and is pressed upward by means of a spring 55 engaging a pin 56. At one side of the pivot 54 is a lever arm 57 at the end of which is loosely pivoted a rod 58 which extends down through a guide 59 into the path of a fan 60 which forms a part of the clockwork mechanism 38. The push button 53 is also provided with a hooked arm 61 which is adapted to be engaged by a hook 62 that has a cam projection 63 extending into the path of the long pins on the last or "dummy" slide 14. This hook, however, is not engaged by the short pins 13 on the slides 12.

My present device may be used in theaters where two projecting machines are employed alternately, and in such cases it is desirable to automatically shut off the light from the lantern 2 when all the slides have been exhibited, in order that the other projecting machine may be brought into action without delay. For this purpose I provide a shutter 65 which slides in a frame 66 in front of the condenser tube 3, as best shown in Figs. 3 and 8. This shutter is normally held in its closed position by means of a spring 67, one end of which is attached to the shutter, while its other end is attached to a fixed bracket 68. The shutter 65 carries a hook 69 which holds the shutter in its open position, as shown in Fig. 3, by engaging a pin 70 carried by a lever 71 that is secured to one end of a horizontal rock shaft 72. The opposite end of the rock shaft 72, adjacent to the display space 6, carries an arm 73 that is disposed directly beneath the cam projection 63 on the hook 62. A spring 74 presses against the arm 73 and normally holds the lever 71 in the position shown in Fig. 3.

In starting the machine, the push button 53 is pressed down, thereby causing the hooked arm 61 to snap under the hook 62 and also raising the rod 58 from engagement with the fan 60, whereupon the clockwork mechanism begins to operate and the slides 12 are fed one by one from the magazine 5 into the display space 6 and thence into the receptacle 7 by means of the escapement mechanism described above. When the last slide 14 descends into the display position, its pins 13 being longer than the pins on the preceding slides will engage the cam projections 63 of the hooks 62 and thus release the push button 53 which will rise under the influence of the spring 55, thus lowering the rod 58 into the path of the fan 60 and stopping the clock.

As the slide 14 continues to descend, its pins 13 strike the arm 73 and rock the shaft 72 to release the pin 70 from the hook 69, whereupon the spring 67 moves the shutter 65 in front of the condenser tube and thus shuts off the light from the lantern 2. The pack of slides may then be removed from the receptacle 7 and replaced in the magazine 5, when the machine is again ready to operate.

Figs. 8, 9 and 10 show a modified escapement mechanism in which one of the shafts 80 of the clockwork mechanism 38 is connected to mechanically reciprocate the escapement devices 9. In this form of my device, the shaft 80 carries a crank 81 that is pivotally connected by means of a link 82 to a pair of parallel slotted bars 83 which reciprocate upon a pin 84 extending through slots 85 in the bars 83. The bars 83 are riveted together and are secured at their ends to straps 86 which are attached to the escapement devices 9, as shown in Fig. 9.

This modified form of my device operates in the same manner as the form shown in Figs. 1 to 7, with the exception that the escapement members 9 are reciprocated by the direct action of the clockwork transmitted through the shaft 80 and the crank 81. Numerous changes in the construction and arrangement of parts may be made in the apparatus which I have herein shown and described, and I therefore desire that no limitations be imposed upon my invention except such as are indicated in the appended claims.

What I claim is:

1. An exhibiting device comprising a magazine for holding transparent slides or the like, a display space below the said magazine, an escapement device adapted to reciprocate horizontally and rectilinearly across the path of movement of the said slides below the said display space and automatically operable means for reciprocating the said escapement device at predetermined time intervals.

2. An exhibiting device comprising means for holding a series of transparent slides or the like, a display space, an escapement device for successively stopping and releasing the slides at the said display space comprising a reciprocable member, an escapement arm pivotally secured to the said member, and an additional member for supporting the said slides when released by the said escapement member and during a portion of the remaining movement of the said escapement device.

3. An exhibiting device comprising a magazine for holding transparent slides or the like, a display space disposed below the said magazine, a receptacle disposed below said display space and means for cushioning the fall of the slides from the said display space into the said receptacle, the said cushioning means comprising an endless chain or the like, members carried by the said chain adapted to be engaged by the descending slides, and means for checking the movement of the said chain.

4. An exhibiting device comprising a magazine for holding transparent slides or the like, a display space disposed below the said magazine, a receptacle disposed below said display space and means for cushioning the fall of the slides from the said display space into the said receptacle, the said means comprising downwardly and forwardly extending guides, and resilient means for receiving each slide as it is discharged from the said guides.

5. An exhibiting device comprising a magazine having an inclined support for a plurality of vertical slides or the like, a follower adapted to urge the said slides to the lower part of the said magazine, a display space disposed below the said magazine, vertical guides extending from the said magazine passing the said display space and automatic escapement mechanism for successively supporting and releasing the said slides at the said display space, a receptacle disposed below the said display space for receiving the said slides and means for cushioning the fall of the said slides within the said receptacle, the said cushioning means comprising an endless chain or the like, members carried by the said chain adapted to be connected by the descending slides, and means for checking the movement of the said chain.

6. An exhibiting device comprising a magazine for holding transparent slides or the like, a display space, and an automatically operable escapement for controlling the movement of the said slides in succession and by gravity from the said magazine to the said display space, the said escapement comprising a horizontally reciprocable member adapted to be engaged by projections on the said slides, an arm pivoted to the said member and adapted when horizontal to be flush with the top of the said member and a spring tending to move the said arm out of horizontal position.

7. An exhibiting device comprising a magazine for holding transparent slides or the like, a display space, and an automatically operable escapement for controlling the movement of the said slides in succession and by gravity from the said magazine to the said display space, the said escapement comprising a U-shaped yoke and a time-controlled solenoid for reciprocating the said yoke at predetermined time intervals, each of the arms of the said yoke being provided with an escapement device comprising a lateral projection adapted to be engaged by projections on the said slides, an arm pivoted adjacent to the said projection and adapted, when horizontal, to be flush therewith, and a spring tending to raise the said arm out of horizontal position, the said arm being adapted to be engaged by the descending slide, and the weight of the slide being thereafter transferred from the said arm to the said lateral projection by the horizontal movement of the said yoke, the said projection being adapted to release the slide on the reverse movement of the said slide.

In testimony whereof I the said Thomas J. Mosure, have hereunto set my hand.

THOMAS J. MOSURE.

Witnesses:
R. D. Brown,
John F. Will.